2,810,698

Patented Oct. 22, 1957

2,810,698

ALUMINA STABILIZED BY THORIA TO RESIST ALPHA ALUMINA FORMATION

Sterling E. Voltz, Brookhaven, and Sol W. Weller, Drexel Hill, Pa., assignors to Houdry Process Corporation, Wilmington, Del., a corporation of Delaware No Drawing. Application January 26, 1955, Serial No. 484,312

1 Claim. (Cl. 252—463)

This invention relates to contact material consisting predominantly of gamma alumina, and particularly to the use of minor amounts of thorium dioxide as a stabilizer adapted to decrease the likelihood of formation of alpha alumina even at severe conditions at which uninhibited gamma alumina would be at least partially transformed to alpha alumina.

The form of alumina having the crystal structure of sapphire, ruby, thermally transformed alumina gel, emery and corundum, and having an X-ray diffraction pattern including the combination of strong lines at 3.48, 2.55, 2.08 and 1.60 Angstroms is designated as alpha alumina.

By methods such as X-ray diffraction it is feasible to designate accurately the proportion of alpha and/or gamma in a particular sample. Gamma alumina designates the structure which on X-ray diffraction is identified by the combination of strong lines at 2.41, 1.98 and 1.39 Angstroms, and generically covers a variety of aluminas sometimes designated as chi, eta, delta, kappa and theta. Gamma alumina is generally a more expensive material than alpha alumina. Accordingly, gamma alumina is generally employed only when its superior performance justifies its greater cost.

Particles of contact material consisting predominantly (on a mol percent basis, and ordinarily on a weight percent basis) of gamma alumina are employed as desiccants, adsorbents, heat transfer agents, catalysts, catalyst carriers, and for other purposes. In most such uses, advantages accrue from controlling conditions (particularly temperature, pressure, steam concentration, and acid concentration) in order to avoid unduly increasing the tendency of the alumina to form alpha alumina. Inasmuch as some materials, such as molybdenum oxides, tend to catalyze formation of alpha alumina at the conditions at which molybdena catalysts are sometimes employed, the goal of preserving gamma alumina characteristics is not always attainable.

Gamma alumina may be prepared by carefully regulating the calcining of a multihydrate (alpha trihydrate, beta trihydrate, gel, and amorphous) or alpha monohydrate. Gamma alumina does not occur in nature, nor in the equilibria systems involving high temperature steam and alpha alumina. All varieties of gamma alumina are readily and irreversibly transformed to alpha alumina at temperatures below the fusion point (3704° F.).

At various temperatures within the range from about 650° to 3650° F., various forms of gamma alumina undergo the transition to alpha alumina. The steam pressure, absolute pressure, concentration of acid vapor, and related conditions can provide relatively severe transition conditions at even the lower portion of the temperature range. At anhydrous, non-acidic, high pressure conditions the gamma alumina is stable at higher temperatures. It is convenient to designate as the transition temperature the lowest temperature at which a sample of gamma alumina undergoes transition to alpha alumina at a measurable rate when conditions other than temperature are least favorable to the conversion. This invention concerns the use of a minor amount of stabilizer, whereby the gamma alumina is not transformed at conditions so severe as to promote the transition of uninhibited gamma alumina. The stabilizer is conveniently considered as an agent for raising the transition temperature, but the gamma alumina materials of the present invention may be useful under conditions of acidity, humidity, etc., more severe than those employed in measuring the transition temperature.

Although corundum, ruby and sapphire have low surface area and little tendency toward adsorption of water, the alpha alumina resulting from the dehydration of beta monohydrate (for example, diaspore) can have a surface area as high as 85 m.²/g., and can have a significant tendency to adsorb moisture. Alpha alumina samples derived from various form of gamma alumina have a wide range of surface areas.

The difference in structure between gamma and alpha is such that there is a very great difference in the effectiveness of gamma and alpha alumina as catalysts, catalyst carriers, desiccants, and related uses. For example, an alpha alumina having a surface area of 80 m.²/g. and an adsorbed moisture content of 0.1% is not as effective a catalyst carrier for a platinum hydrogenation catalyst as a gamma alumina having equivalent area and moisture content.

Most samples of alpha alumina have a significantly lower surface area than most samples of gamma alumina, and many inaccurate designations of a material as alpha or gamma have been based merely upon surface area measurements. However, there is a wide range of large areas (e. g. 2 to 85 m.²/g.) shared by both gamma alumina and alpha alumina.

Many inaccurate designations of a material as alpha or gamma alumina have been erroneously based upon measurements of the moisture content. Because such materials have sometimes been called partial hydrates and sometimes have been called anhydrous alumina, it is important that any description be interpreted in the light of the most reliable data on alumina, and that care be exercised to avoid being misled by the confusing terminology which has been employed in some writings.

Numerous efforts have been made to provide useful forms of gamma alumina which were resistant to formation of alpha alumina, but some of the stabilizers which have been proposed, such as minor amounts of sodium oxide and potassium oxide, have also adversely affected the properties of the alumina as a carrier and/or catalyst. The inconsistency between what might have been predicted and what results were obtained by various proposed stabilizers in various combinations and amounts has necessitated the approach that the prediction of the usefulness of a contemplated combination comprising a stabilizer is impossible, and that such usefulness is determinable only by empirical tests. Stabilizers for alumina carriers are even more unpredictable than the catalysts employed on such carriers.

In accordance with the present invention, a contact material consisting predominantly of gamma alumina (that is, more than 50 mol percent gamma alumina) is stabilized by the presence of an amount of thorium dioxide within a small range of concentrations. In certain advantageous embodiments of the invention, the gamma alumina is in itself useful, but in other embodiments, the gamma alumina is a carrier for a catalytic component (e. g. platinum or chromia) which is partially deactivated if the alumina is transformed to the alpha form.

Reference is made to several examples which illustrate methods of preparing and using alumina contact materials with and without the present invention.

*Example I*

Commercially available activated alumina pellets were subjected to 1750° F. and 20% steam for two hours. After this accelerated aging test, the pellets were predominantly alpha alumina and the residual content of gamma alumina structure was so nearly zero that the pellets were deemed deactivated.

Similar pellets in which 1.01% of the metal ions were thorium, and prepared by impregnating commercially available activated alumina pellets with a dilute solution of thorium nitrate and calcining, were subjected to the same accelerated aging test, and found to retain 90% of the gamma structure. The aged pellets in which 1.01% of the metal ions were thorium contained less than 10% alpha alumina.

*Example II*

Gamma alumina particles were impregnated with an aqueous solution of chromic acid and calcined. In the resulting chromia on alumina catalyst, 14.4% of the metal ions were chromium and 85.6% were aluminum. This control catalyst was compared with a catalyst characterized in that of the metal ions, 1.1% were thorium, 84.7% aluminum, and 14.2% chromium. Such chromia alumina catalyst is conveniently designated as one stabilized by 1.1 cation percent thorium. Catalysts containing thoria are conveniently prepared by calcining particles after impregnation with an equal volume of an aqueous solution of thorium nitrate of a concentration affording, in the finished catalyst, the desired concentration of thorium ions relative to other metal ions.

The chromia alumina catalysts were tested at standard conditions to determine their effectiveness in dehydrogenating butane. In the standard dehydrogenation tests, normal butane was passed over the catalyst at G. H. S. V. of 500, temperature of 1075° F. for a period of 10 minutes. The selectivity of the dehydrogenation catalyst was determined on a mol percentage basis. The catalysts were also subjected to a very severe accelerated aging test consisting of treating the catalyst with air, plus 20% steam, at several temperatures. The accelerated aging in the presence of steam at various temperatures simulated the degeneration of the catalyst activity during many months of normal dehydrogenation operation.

The accelerated aging at 1500° F. decreases the selectivity of the control catalyst about as much as the usual half life of such a catalyst. The deactivation at 1600° F. corresponded to that resulting from use for a period longer than the catalyst life, as did the deactivation at 1750° F. The three degrees of accelerated aging are conveniently designated as moderate, severe, and extreme aging.

The percentage improvement achieved by the use of thoria as a stabilizer was noted and is referred to in the following table:

| | Control without ThO$_2$ | With 1.1 Cation, Percent Th | Percent Improvement |
|---|---|---|---|
| low temperature control: | | | |
| percent gamma initially | 100 | 100 | |
| percent conversion of butane | 52 | 53 | |
| percent selectivity | 51 | 39 | |
| after 1,500° F., 2 hrs., 20% H$_2$O aging treatment: | | | |
| percent gamma | 60 | 85 | 42 |
| percent conversion of butane | 49 | 59 | 20.4 |
| percent selectivity | 32 | 39 | 21.8 |
| after 1,600° F., 2 hrs., 20% H$_2$O aging treatment: | | | |
| percent gamma | 33 | 85 | 262 |
| percent conversion of butane | 44 | 51 | 16 |
| percent selectivity | 20 | 32 | 60 |
| after 1,750° F., 2 hrs., 20% H$_2$O aging treatment: | | | |
| percent gamma | 0 | 45 | |
| percent conversion of butane | 30 | 31 | 3 |
| percent selectivity | 7 | 16 | 129 |

The control catalyst, after the moderate aging, had been deactivated to 32% selectivity. The catalyst containing 1.1 cation percent thorium ions as a stabilizer was not reduced to 32% selectivity until after the severe aging period. Of importance was the observation that the thoria stabilized catalyst was 60% better than the control as to selectivity after the severe aging treatment. The 1600° F. treatment also showed that the thoria stabilized catalyst was 262% better than the control in retaining gamma structure, and 16% better in converting the butane to other compounds. These tests indicated that the useful life of said thoria stabilized catalyst should be significantly longer than said control catalyst.

*Example III*

Samples of a gamma alumina carrier prepared in such a manner as to possess a very high degree of resistance to attrition were impregnated to contain controlled amounts of thoria as a stabilizer. In accelerated aging tests on chromia-alumina containing various controlled amounts of thoria stabilizer, the operable range of stabilizing concentrations was established. These samples of catalyst were subjected to an accelerated aging test consisting of two hours at 1750° F. in the presence of 20% steam. After the aging tests, the sample free from thoria was converted completely to the alpha form (that is it contained no gamma form after the aging test), the sample containing 0.5 cation percent thorium contained 20% gamma form, and the sample containing 1.0 cation percent thorium contained 55% gamma form. It is convenient to describe the results of the aging tests in terms of the retention of gamma structure, although the amount of conversion to the undesirable alpha form was determined in the X-ray diffraction analysis of the artificially aged catalysts.

The thoria-stabilized alumina-chromia catalysts not only retain their gamma structure, but also they retain a high degree of resistance to attrition. For example, a chromia-alumina catalyst prepared from commercially available activated gamma alumina pellets, and initially having a hardness index (determined in the standard ball mill test as the percentage by weight of particles retaining substantially their initial size after rotating at 80 R. P. M. for one hour in a thick walled stainless steel drum containing stainless steel balls) of 18, had a hardness index of zero after the accelerated aging test. The chromia on alumina catalysts stabilized in accordance with the present invention have a high hardness index both before and after severe aging.

By a series of tests similar to Examples I, II, and III, it was established that of all the metal ions in the contact material, the cation mol percent concentration of the thorium should be within the range from 0.5 to 1.5% in order to achieve an aluminaceous material having the stability characteristics of the present invention.

Obviously many modifications and variations of the invention as hereinbefore set forth may be made without departing from the spirit and scope thereof, and therefore only such limitations should be imposed as are indicated in the appended claim.

What is claimed is:

In the use of contact materials containing a major proportion of gamma alumina the method of inhibiting the transformation of a contact material to alpha alumina from an alumina containing at least a trace of moisture and having an X-ray diffraction pattern of gamma alumina and distinguishable from alpha alumina, which method consists of incorporating in the contact material a minor amount of thorium dioxide, whereby the contact material may be subjected to more severe conditions without significant transformation to alpha alumina, the thorium ions constituting from about 0.5 to about 1.5 cation percent of the metal ions in said contact material.

References Cited in the file of this patent

UNITED STATES PATENTS 2,454,227   Smith et al. _____ Nov. 16, 1948